71522
PATENTED NOV 26 1867
*J. A. Leibey's Improvement in*
HORSE POWER:
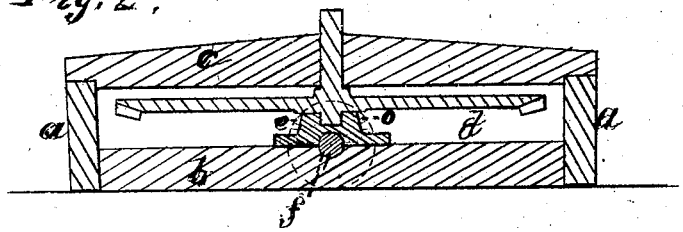
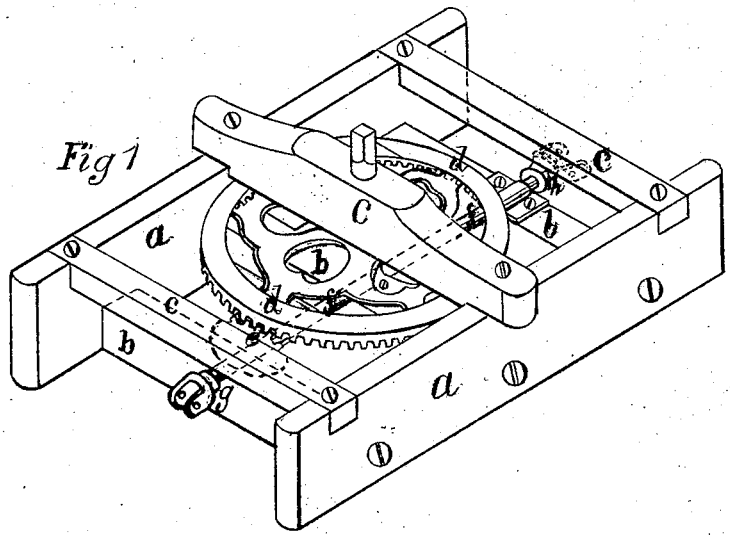

United States Patent Office.

J. A. LEIBEY, OF DAVENPORT, IOWA.

Letters Patent No. 71,522, dated November 26, 1867.

---

IMPROVEMENT IN HORSE-POWERS.

---

The Schedule referred to in these Letters Patent and making part of the same.

---

TO ALL WHOM IT MAY CONCERN:

Be it known that I, J. A. LEIBEY, of Davenport, in the county of Scott, and State of Iowa, have invented certain new and useful Improvements in Reversing the Motion given by a Horse-Power; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a novel construction of horse-powers, whereby they may be made to give a direct or reverse motion without changing the direction of the animals.

Figure 1 is a perspective view, and

Figure 2 a transverse vertical section of a horse-power embodying my improvement.

My improvement may be applied to horse-powers of nearly all styles; and in the drawings it is shown applied to the simplest form of a sweep-power. In this case I construct a strong frame in the ordinary manner, consisting of the side pieces $a$ and cross-pieces $b$ $c$. In this frame I mount a master or driving-wheel, $d$, having the lower end of its shaft resting in box $o$, as shown in fig. 1. Directly under the centre of this wheel $d$ I place a shaft, $f$, having a pinion, $e$, on it, arranged to gear into and be operated by the wheel $d$. This shaft, $f$, I extend out at each side of the machine, and provide each of its ends with a coupling, $g$ and $h$, as represented by fig. 2.

By this means a threshing-machine, or any similar machine, may be attached to one end of the shaft $f$, and made to rotate in one direction; and then, by turning it about and attaching it to the opposite end of the shaft, it will have its motion reversed, while the animals and the driving-wheel continue their motion in the same direction; and thus, by an exceedingly simple device, I produce a horse-power which will give a direct or reverse motion at will, and can thus be readily applied to a great variety of purposes.

Having thus described my invention, what I claim is—

Constructing horse-powers with a single driving-shaft, $f$, extending under the master-wheel, out at each side, and provided with a coupling at its opposite ends, substantially as and for the purpose set forth.

J. A. LEIBEY.

Witnesses:
  GEO. P. WHITCOMB,
  H. H. BROOKS.